United States Patent [19]
Sakurai et al.

[11] Patent Number: 4,470,570
[45] Date of Patent: Sep. 11, 1984

[54] CONTROL ASSEMBLY FOR AIRCRAFT

[75] Inventors: Seiya Sakurai, Seattle; Jack N. Funk, Bellevue, both of Wash.

[73] Assignee: The Boeing Company, Seattle, Wash.

[21] Appl. No.: 428,151

[22] Filed: Sep. 29, 1982

[51] Int. Cl.³ ............................................ B64C 13/06
[52] U.S. Cl. .................................... 244/235; 244/236
[58] Field of Search ............... 244/220, 221, 223, 228, 244/229, 235, 236, 111, 87, 122 R; 74/512, 539, 542

[56] References Cited

U.S. PATENT DOCUMENTS

| | | | |
|---|---|---|---|
| 2,610,006 | 9/1952 | Boyce | 244/235 |
| 2,669,284 | 2/1954 | Pall et al. | 244/122 R |
| 2,998,211 | 8/1961 | Evans | 74/512 |
| 3,217,240 | 11/1965 | Grant et al. | 244/236 |

Primary Examiner—Trygve M. Blix
Assistant Examiner—Rodney Corl
Attorney, Agent, or Firm—Hughes, Barnard & Cassidy

[57] ABSTRACT

A pedal control assembly for a pilot station of an aircraft. The pedals are arranged in a module for linear sliding movement and position sensing members transmit appropriate signals to control components of the aircraft.

26 Claims, 15 Drawing Figures

CONTROL ASSEMBLY FOR AIRCRAFT

TECHNICAL FIELD

The present invention relates to a pilot station for an aircraft, and more particularly to a pedal control assembly for the pilot station which enhances convenient pilot operation and is especially adapted to generate control signals at the location of the pedal assembly to control movement of aircraft components remote from the pedal assembly.

BACKGROUND ART

In present day aircraft, it is quite common for the flight controls to be arranged so that the pilot controls movement of the rudder by means of foot operated controls. The usual arrangement is to have left and right pedals, each mounted to a related downwardly extending pivot arm so that the pedals move in an arcuate path. The two pedals are generally interconnected in a manner that when one pedal is depressed, the other pedal moves toward the pilot. The pedals are commonly connected to a cable system which extends from the forward cockpit area to the tail section to connect to control devices for the actuators that actually move the rudder.

When the aircraft is taxiing on the ground, the rudder pedals are operably connected to a steerable ground wheel or wheels in a manner that pushing one or the other of the pedals forwardly (with the other pedal moving in the opposite direction) causes the ground wheel to turn. In addition, the pedals are mounted for rotation about transverse axes at the heel portions of the pedals. By rotating the toe portion of the pedals forwardly and downwardly about these heel axes of rotation, the brakes can be applied.

One of the shortcomings of such prior art foot pedal assemblies is that to enable the pedals to have adequate linear travel to enable the pilot to provide adequate control, the pivot arms and their associated components are necessarily positioned below the floor level of the cockpit. Not only does this occupy space in the aircraft which could be used advantageously for other functions, but it limits the extent to which the pilot location could be moved to a more forward location, this being more desirable since it would normally provide the pilot with greater visability.

Another problem area is the adjustment of the pedal location to accommodate pilots of different height. The pilot seat is usually made adjustable so that it could be raised or lowered, as well as moved more forwardly or rearwardly, and the pedals are also generally made adjustable so that the neutral position of the pedals could be moved more forwardly or rearwardly to a position on its arcuate path of travel. The relative positions of the window, the seat and the pedals are generally selected to accommodate the pilot of average height so that the pedals would be placed comfortably at a location moderately below and forward of the pilot's seat. Thus, the shorter pilot will generally adjust the seat to a higher position (to place the pilot's eyes at the proper location for a view through the window) and the neutral position of the pedals will be moved rearwardly toward the seat and/or the seat moved further forward. This places the shorter pilot in a more awkward position to maneuver the pedals. On the other hand, the rather tall pilot is also inconvenienced, in that the seat is lowered and possibly moved rearwardly. Also, the neutral position of the pedals may be moved further forward, so that the arcuate path of travel is slanted from the operating path which would be most comfortable to the pilot. Also, when the pedals are moved from the intermediate location to accommodate either the taller or shorter pilot, the slant of the pedals is moved from the optimum position so that the pilot has greater difficulty in rotating the pedals properly to apply the brakes.

With regard to the basic control system of the aircraft, over the years consideration has been given to eliminating (or at least limiting) the use of cable assemblies for control of aircraft components and substituting an electrically operated control system. In such a system, the pilot would operate the controls to generate electric signals which would be transmitted through wires to the appropriate components, with the signals then operating control devices to cause the appropriate movement of the corresponding actuator or other device. This in turn leads to consideration for possibly other arrangements of the pilot controls themselves to function more effectively with such modified control systems, with respect to such things modularizing the controls to make maintenance easier and less expensive.

A search of the patent literature disclosed a number of patents which are discussed briefly below. While some of these are considered to be not particularly relevant to the present invention, all are mentioned to ensure the applicants are properly fulfilling their duty of disclosing all prior art which might be of any relevance.

U.S. Pat. No. 1,222,839, Wright, discloses a brake mechanism where there is one pedal, and a number of brake elements are actuated substantially simultaneously from the one pedal.

U.S. Pat. No. 1,608,611, Milburn, shows a brake pedal, the angular position of which can be adjusted.

U.S. Pat. No. 1,844,607, Sikorsky, shows a control pedal system for an aircraft where there are two sets of pedals. Each pedal has a horizontal platform that is mounted for linear motion, and a slanted upright foot engaging portion mounted to downwardly extending pivot arms. The two sets of pedals are selectively interconnected to operate control cables.

U.S. Pat. No. 2,074,730, Kerr, Jr., shows a pedal control mechanism where the pedals are mounted to pivot arms; the subject matter of the patent relates primarily to the hydraulic system associated with the pedals.

U.S. Pat. No. 2,478,546, Pickens et al., discloses pivotally mounted pedals that have an adjusting mechanism for the location of the pedals.

U.S. Pat. No. 2,697,566, Glass, shows a control system for an aircraft which can be converted from a three-control system to a two-control system, and the controls utilize pedals mounted to pivot arms.

U.S. Pat. No. 2,757,630, Ottinger, discloses a foot steering apparatus for a boat. The pedals are mounted to slideways which in turn connect to cables that control the position of an outboard motor.

U.S. Pat. No. 2,760,739, Reichert, relates to a control apparatus for an airplane where the control elements are power operated and which serve to give the pilot the "feel" of the control element such as would occur in the case of control elements that are manually powered.

U.S. Pat. No. 3,129,605, Bonnell, Jr. et al, shows a control system where the pedals are mounted on pivot arms, and the position of these pedals can be adjusted.

U.S. Pat. No. 3,217,240, Grant et al, shows a control system where there is an electrical output that varies in accordance with the force applied.

U.S. Pat. No. 3,377,881, Lucas, discloses a particular linkage for control pedals that are mounted to pivot arms.

U.S. Pat. No. 3,576,302, Palfreyman, shows a solid state rudder pedal positioned sensor to provide an electrical output signal corresponding to the adjusted position of the rudder pedal, with the rudder pedal being pivotally mounted.

U.S. Pat. No. 3,785,596, Chinchester-Miles, shows a control system utilizing rudder pedals which turn about a vertical axis for yaw control.

U.S. Pat. No. 4,004,537, Nilsson, shows a steering mechanism where the rudder is controlled by a manually operated steering wheel.

In view of the foregoing, it is an object of the present invention to provide a pilot station, and more particularly a pedal assembly for such pilot station, which provides greater adaptability for ease of operation by both taller and shorter pilots, which is relatively compact, and which is particularly adapted to operate in a control system where control signals are generated at locations proximate to the controls.

SUMMARY OF THE INVENTION

The pilot control station of the present invention is particularly adapted for use in an aircraft where control signals are generated at the control station to control movement of the aircraft components remote from the control station. The station has a vertical axis, a longitudinal axis generally coinciding with a flight path of the aircraft and a transverse axis.

The pilot station comprises a pilot seat having a body support platform to support a pilot at the location and to establish:

(1) an eye reference location, corresponding to a proper viewing location for a view through a window of the aircraft;
(2) a pedal control area located downwardly and forwardly of the support platform for convenient placement of a pilot's feet;
(3) a pedal control axis aligned relative to the support platform for optimized extended and retracted movement of the feet of the pilot.

There is a pedal assembly comprising a main frame located at the pedal control area and having right and left laterally spaced guide frame members establishing substantially linear right and left travel paths generally aligned with the pedal control axis. There are also right and left pedal mounting members mounted to the right and left guide frame members, respectively, for movement along said right and left travel paths.

The right and left pedal members are adapted to be engaged by right and left feet of the pilot, respectively. The right and left pedal members are pivotally mounted to the right and left mounting members about respective generally transverse axes to be rotated by rotation of the pilot's feet.

There is first sensing means operatively arranged relative to the pilot mounting members to be responsive to linear location of the pedal members along the travel paths to generate a control signal related to the linear location. There is scond sensing means operatively arranged relative to the pedal members to sense angular movement of the pedal members relative to the pedal mounting members and generate a control signal corresponding to the angular movement. Thus, the control pedals can be conveniently moved linearly along the pedal control axis and rotated relative to the pedal mounting members to generate control signals in the first and second sensing means.

In the preferred form, the main frame is mounted to a base frame in a manner that the main frame is adjustably mounted so it can be moved to a higher and more rearward position to accommodate leg position of shorter pilots and to a lower and more forward position to accommodate leg position of a taller pilot, with the positions of the main frame maintaining the travel paths of the pedal mounting members in substantial alignment with the pedal control axis. Also, the seat can be adjusted at least along the vertical axis to optimize pilot eye location relative to the eye reference location, with the main frame being adjustable to accommodate pilot position relative to higher or lower seat positions.

Desirably, the first sensing means is operatively connected between at least one of the guide frames and the pedal mounting member to sense relative linear motion therebetween. In the preferred form, the first sensing means is a linear sensor which extends an retracts in response to linear movement of its related pedal member relative to the guide frame member.

Desirably, the second sensing means is operatively connected between at least one of the pedal members and its related mounting member in a manner to be movable with the second mounting member and thus generate its control signal independently of linear movement of its related mounting member.

In a particular embodiment, the pedal mounting members each have first and second ends, with the pedal members being mounted to the first ends. There is pedal movement interconnecting means being connected between the second ends in a manner that linear movement of one of the pedal mounting members causes opposite linear movement of the other of said pedal mounting members. Specifically, the interconnecting means comprises a bell crank means pivotally mounted about a pivot location intermediate the second ends of the pedal mounting members, and having two opposite pivot connections to the second ends of the two pedal mounting members.

In the specific embodiment, there is servomotor means adapted to be responsive to an autopilot and operatively connected to the bell crank means in a manner that rotation of the bell crank means causes relevant movement of the pedal mounting members. Also, there is a centering spring operatively connected to the bell crank means, with the centering spring means having oppositely directed spring members urging the bell crank means to an intermediate neutral position. The spring means provides increasing resistance with greater rotation of the bell crank means from the intermediate neutral position. In the embodiment shown herein, there are a pair of pilot seats and a pair of pedal assemblies as indicated above. Each pedal assembly is in a form of a module adapted for use in connection with that corresponding pilot seat. Further, there is module interconnecting means operatively connected between the pedal modules so that movement of pedal members of one module causes a corresponding movement of the corresponding pedal member of the other module. With regard to linear movement of the pedal mounting members, the bell crank means of one pedal module is connected to the bell crank means of the other module. Also, rotational movement of each pedal member causes movement of a related bell crank which in turn is interconnected to a corresponding bell crank of the other module to cause corresponding movement of the corresponding pedal.

Other features of the present invention become apparent from the following detailed description.

DESCRIPTION OF THE PREFERRED EMBODIMENT

It is believed that a clearer understanding of the present invention and its advantages will be obtained by first discussing the typical prior art prior art cable control system commonly used in present day aircraft, and then describing the structure and operation of the present invention.

Figure 1:
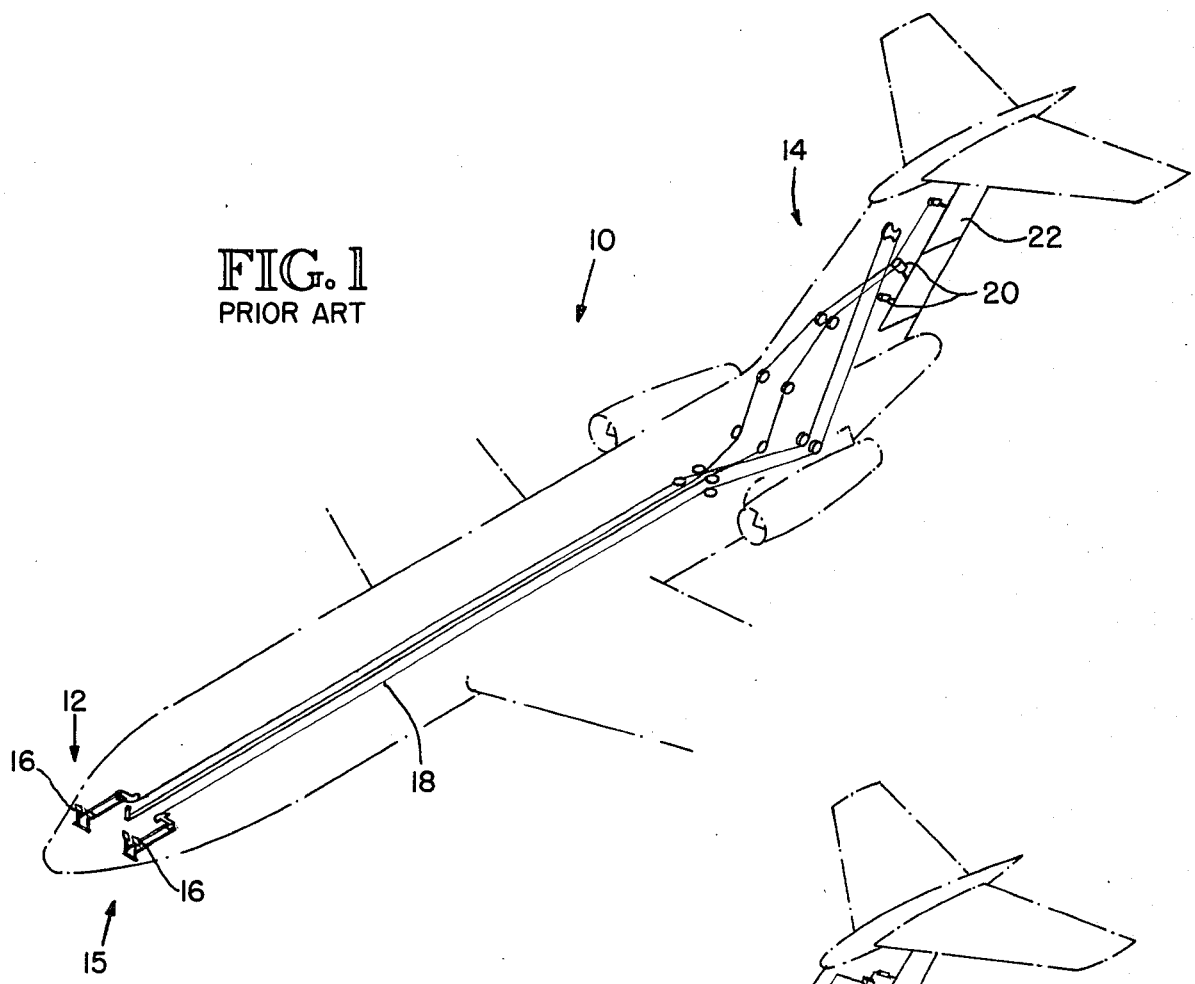
FIG. 1 is an isometric view of an airplane incorporating a typical prior art cable control system for the tail assembly of the aircraft.

Reference is first made to FIG. 1 which illustrates the prior art cable control system somewhat schematically. There is shown an airplane 10 having a forward cockpit area 12 (i.e. pilot station) and a tail assembly 14. In the cockpit area 12 there is a pedal assembly 15, comprising two sets 16 of control pedals operatively connected to control cables 18 that extend the length of the aircraft to connect to a control device 20 located in the tail assembly 14 to control movement of the rudder 22. Normally, the control device 20 would cause movement of suitable actuators which would in turn act physically on the rudder 22 to cause movement thereof.

Figure 2:
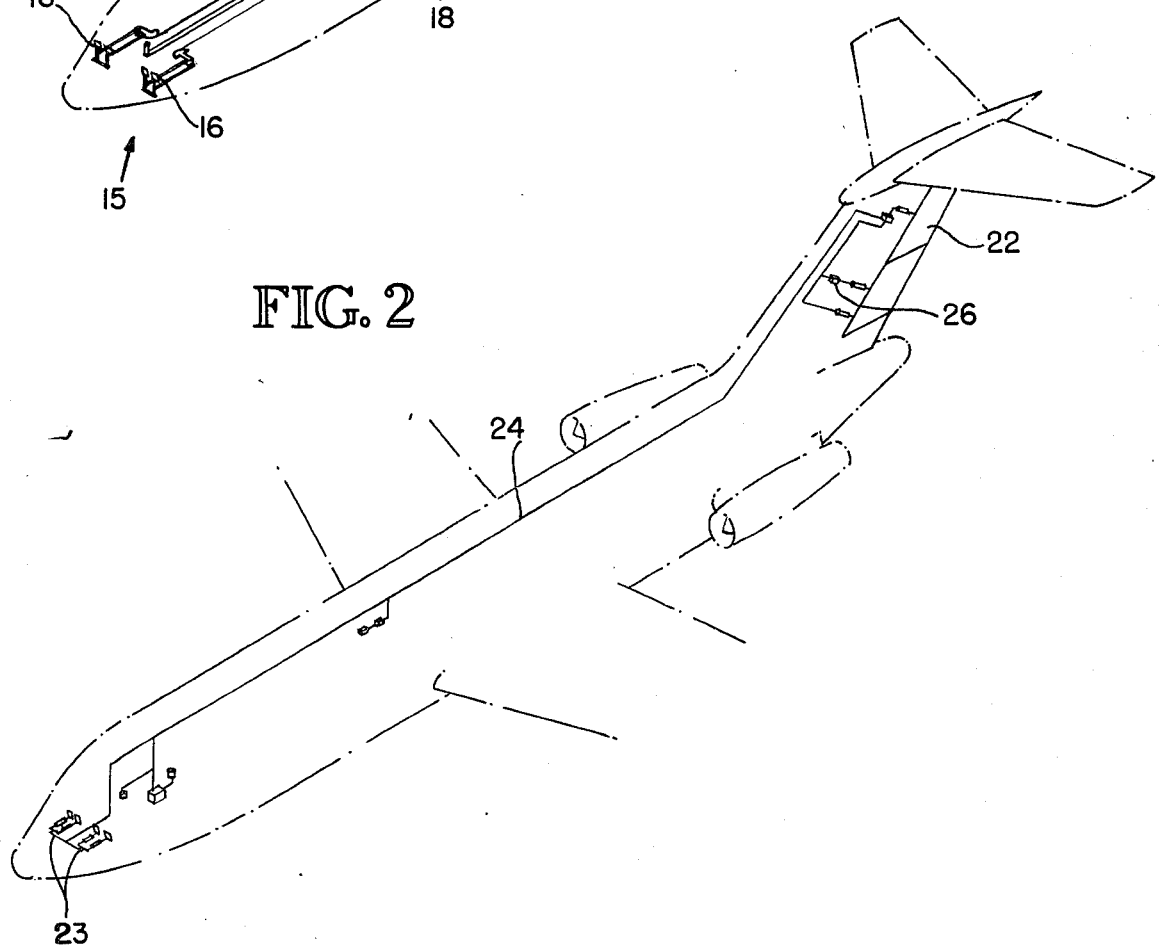
FIG. 2 is an isometric view similar to FIG. 1, illustrating schematically a modified control system where the control components in the cockpit area generate electrical signals to control the movement of the control surfaces.

In FIG. 2, there is a schematic drawing of a proposed modified control system where there are right and left pedal sets 23 connected by an electric wire or wires 24 to control devices 26 for the rudder 22. The control pedals of the sets 23 are moved to generate electrical signals, the strength of which is related to the displacement of the pedals of the sets, and these in turn act through suitable control devices and actuators to move the rudder 22 to the appropriate location.

Figure 3:
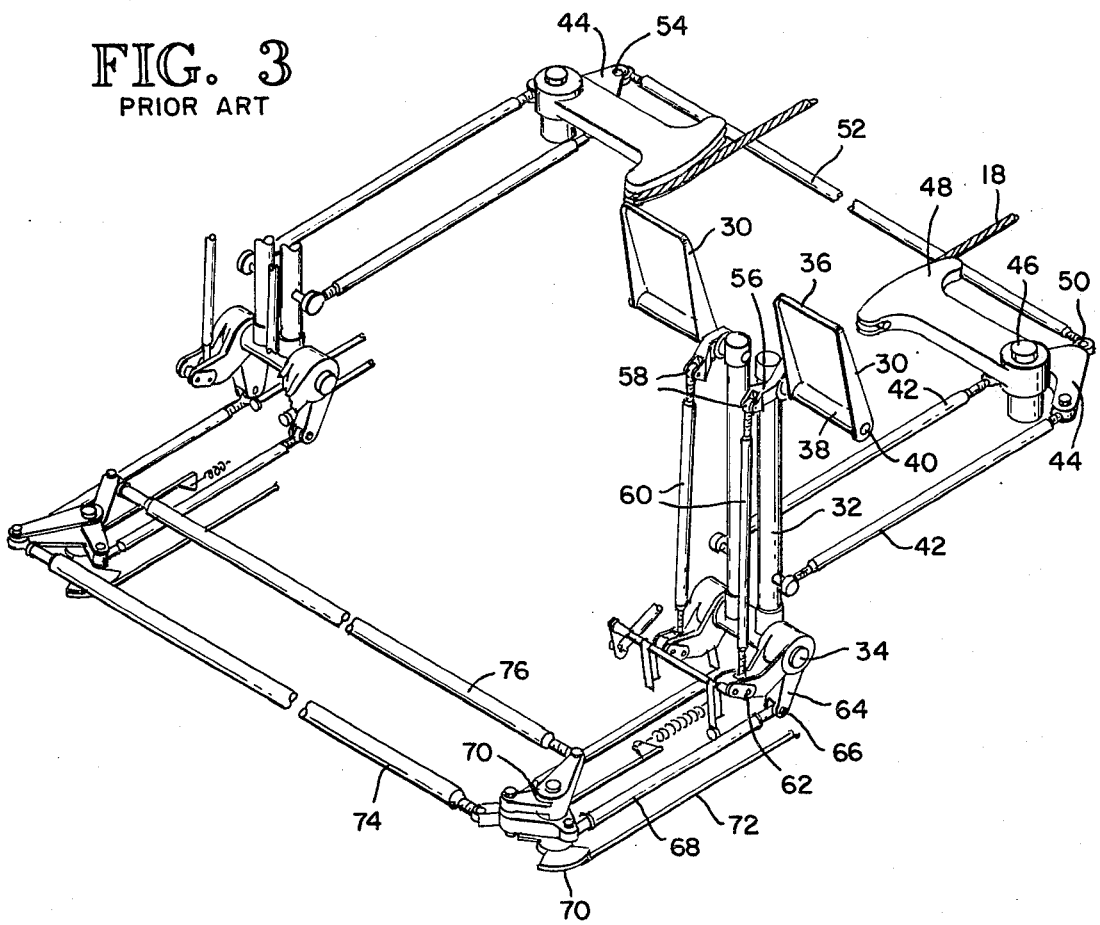
FIG. 3 is an isometric view of a typical prior art control pedal assembly for a cable type control system, such as that shown in FIG. 1.

A typical prior art control pedal assembly 15 is shown in more detail in FIG. 3. It can be seen that each set 16 of control pedals comprises left and right pedal members 30, each connected to an upper end of a related generally vertically aligned mounting arm 32, which is in turn mounted at its lower end for rotation about a transverse horizontal axis, indicated at 34. Each pedal member 30 has a toe portion 36 and a heel portion 38 adapted to engage, respectively, the toe and heel portion of the pilot's foot. Each pedal member 30 is hinge mounted at 40 at the heel portion 38. For convenience of illustration, only the left set of pedals 16 is shown in its entirety, and the pedal members 30 of the right set 16 are not shown. However, it is to be understood the left set 16 is substantially the same as the right set 16.

Connected to each mounting arm 32 a short distance above its lower axis of rotation 34 is a related actuating rod 42, with the opposite rear ends of the two actuating rods 42 being connected to opposite sides of a bell crank 44. The bell crank 44 is in turn mounted for limited rotation about a vertical axis positioned at 46 between the rear connecting ends of the two rods 42. The bell crank 44 is rigidly connected to an actuating arm 48 that in turn connects to one of the aforementioned cables 18. A rear arm 49 of the bell crank 44 is connected at 50 to one end of an interconnecting rod 52 which in turn is connected at its opposite end at 54 to a second bell crank 44 for the other pedal set 16.

Fixedly attached to and extending forwardly from the heel portion 38 of each pedal member 30 is an actuating finger 56 pivotally attached at 58 to the upper end of a downwardly extending rod 60, the lower end of which is attached at 62 to an arm of a bell crank 64. The bell crank 64 is in turn mounted for rotation about the aforementioned pivot axis 34 of the mounting arm 32. The bell crank 64 has a second arm which is pivotally connected at 66 to a forwardly extending actuating rod 68. This rod 68 is in turn fixedly connected to a pivotally mounted cable control member 70, attached to a cable 72 which operates the brake system.

The other pedal member 30 has a similar actuating finger 56 which is interconnected through it's own set of components 58-72 to operate another cable which is in turn connected to the brake system. The two cable control members 70 for the two left pedals 30 are interconnected by a rod 74 to insure that rotation of one of the left pedals 30 would cause a corresponding rotation of the other pedal 30. In like manner, there is a second interconnecting rod 76 connecting the cable control members 70 of the two right pedals 30.

When the aircraft is in flight, one or the other of the pedal sets 16 is operated by the pilot to move the cables 18 to in turn control the rudder 22. As indicated previously, when one of the pedal members 30 is depressed by the pilot pushing his foot outwardly, the other pedal member 30 moves toward the pilot. When the pedal members are so moved, the related bell crank 44 rotates to cause a corresponding movement of the rudder. At the same time, the bell crank 44 acts through the interconnecting rod 52 to cause a corresponding movement of the other bell crank 44 which in turn moves the pedal members 30 of the other set 16 in a manner to duplicate the movement of the first set 16. Thus, the movement of the pedal members 30 of the two sets 16 will be exactly the same, regardless of which set is operated.

When the aircraft is operating on the ground, the pedal members 30 are manipulated in the same manner, but this results in causing the appropriate steering movement of the ground wheel or wheels. In addition, the pedal members 30 can be rotated about their heel axes 40 to operate the wheel brakes. With the interconnection provided by the rods 74 and 76, rotation of a pedal member 30 of one set 16 results in a corresponding rotation of the corresponding pedal 30 of the other set 16.

For ease of operation, it is desirable that the pedal action be as nearly rectilinear as possible. This requires that the mounting arms 32 be sufficiently long so that their center of rotation 34 is spaced a sufficient distance from the pedals 30 so that the motion of the pedals 30 is along an arc of sufficient length and relatively small curvature. Since the pedals 30 are relatively close to the floor level, this requires that the lower ends of the mounting arms 32 and the other components associated therewith extend below the floor level. As indicated earlier, this arrangement occupies space in the aircraft which could be used advantageously for other equipment, and this limits the extent to which the pilot location could be moved to a more forward position in the cockpit area, thus providing greater visability.

As indicated previously, another consideration is the location of a set of two pedals 30 relative to the pilot seat. In the prior art pedal assemblies, such as shown in FIG. 3, there is generally an adjusting mechanism (not shown in FIG. 3) for moving the neutral position of the pedals either further from or toward the pilot seat, depending upon the length of the legs of the pilot. Such adjustment necessarily changes the slant of the arcuate movement of the pedals 30 from the most desirable path of travel. Further, the effect of this pedal adjustment is made only worse when the location of the pilot seat is changed to accommodate pilots that are either shorter or taller than the average. This particular problem will be discussed more fully later herein with reference to FIG. 8, which illustrates the cockpit assembly (i.e. pilot station) of the present invention.

Figure 4:
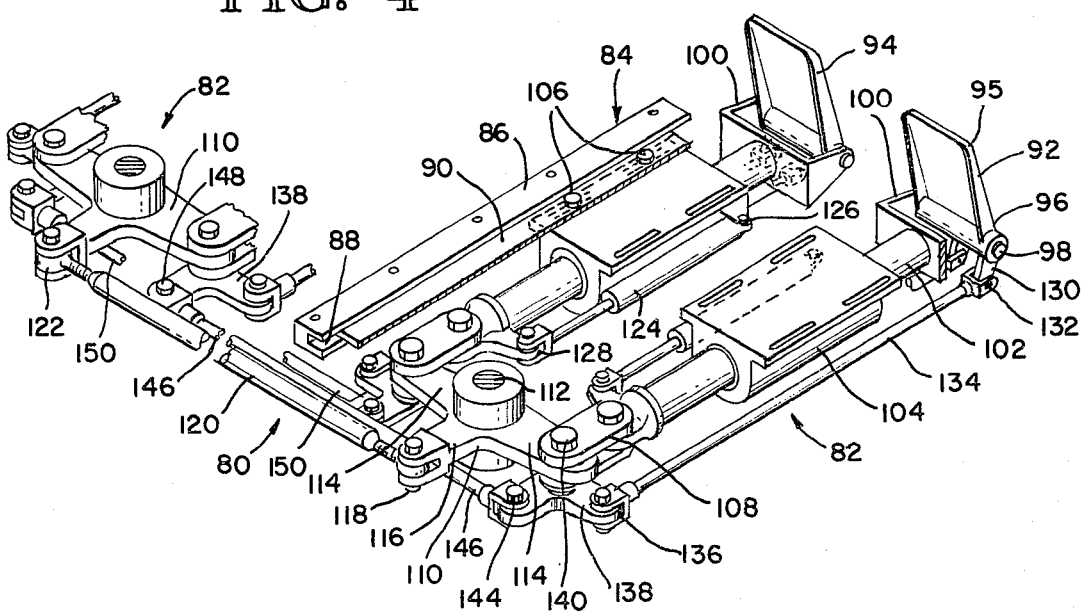
FIG. 4 is an isometric view of a preferred embodiment of the pedal assembly of the present invention.

To describe now the apparatus of the present invention, reference is first made to FIG. 4 which shows the pedal assembly 80 of the present invention. This pedal assembly 80 comprises substantially identical left and right modules 82, one for the pilot and the other for the copilot. For convenience of illustration, in FIG. 4 the right module 82 is shown only partially.

Each module 82 comprises a base frame 84 which comprises two laterally spaced longitudinally extending slide channels 86, each of which defines a longitudinally extending slot 88. For convenience of illustration, in FIG. 4 only the right channel of the frame 84 of the left module 82 is shown.

Mounted to the base frame 84 is an intermediate mounting frame 90 which extends laterally across the top part of its related module 82. For convenience of illustration, only the extreme right portion of the frame 90 is shown in FIG. 4. The right and left side edges of the frame 90 are mounted in the two slots 88 of the side channels 86.

Each module 82 also comprises left and right pedal members 92 and 94, respectively. Each pedal member has an upper toe portion 95 and a heel portion 96, with each pedal member being hinge mounted at 98 about its lower heel portion 96 to a related mounting bracket 100. Each mounting bracket 100 is in turn fixedly attached to the rear end of a related mounting rod 102 which is slide mounted in a mounting block 104, which is in turn fixedly connected (e.g. by bolts 106) to the mounting frame 90. The forward ends of the two rods 102 are connected through pivot links 108 to opposite sides of a bell crank 110, having a generally "T"-shaped configuration. The bell crank 110 is mounted at a center portion thereof at 112 for rotation about a vertical axis, and the bell crank 110 has two laterally extending arms 114, each attached to a related one of the pivot links 108. The bell crank 110 has a leg portion 116 which extends forwardly from the mounting axis 112 to connect at a pivot location 118 to an interconnecting rod 120. The rod 120 is pivotally connected at its opposite end at 122 to a leg 116 of a second bell crank 110 of the right module 82.

There is for each module 82 two linear transducers 124, each of which is connected at 126 and 128 between a related mounting block 104 and rod 102. Thus, linear movement of the pedal members 92 and 94 causes a linear displacement of the two transducers 124, which in turn generate electric signals corresponding to the extent of the linear displacement of the pedals 92 and 94.

Rigidly attached to and extending downwardly from the heel portion 96 of each of the two pedals 92 and 94 is an actuating finger 130, the lower end of which is pivotally attached at 132 to the rear end of a rod 134, the forward end of which is pivotally attached at 136 to a bell crank 138. The bell crank 138 is attached to a related arm 114 of the bell crank 110 for rotation about an axis 140 which coinsides with the vertical pivot axis at which the related link 108 attaches to the arm 114 of the bell crank 110.

Thus, it can be seen that when the left pedal 92 is rotated forwardly and downwardly about its heel located axis 98, the finger 130 acts through the rod 134 to rotate the bell crank 138. A transducer (indicated only schematically at 142 in FIG. 9) is operatively connected to its related pedal 92 in a manner to produce a signal related to the degree of rotation of the pedal 92 about its heel axis 98. The right pedal 94 has a similar linkage 130-140 and transducer 142.

The bell crank 138 has a second connection at 144 to an interconnecting rod 146. The opposite end of the rod 146 is connected at 148 to a second bell crank 138 of the right module 82. The second bell crank 138 for the right pedal 94 of the left module 82 has a similar interconnecting rod 150 connected to its corresponding bell crank 138 of the right module 82. Thus, it can be seen that rotation of the left pedal 92 about its heel axis 98 produces through the interconnecting rod 146 a corresponding motion in the left pedal 92 of the right module 82. Likewise, the rotation of the right pedal 94 causes through its rod 150 a corresponding rotation of the right pedal 94 of the right module 82.

Figure 5:
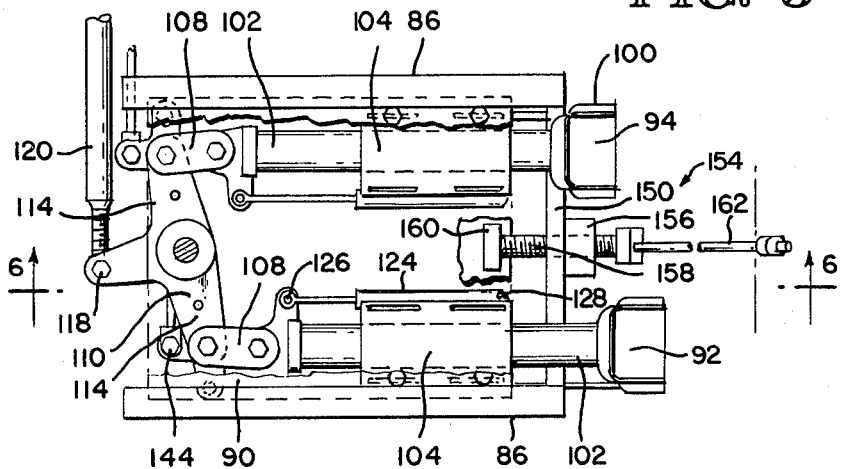
FIG. 5 is a top plan view of one modular unit of the assembly shown in FIG. 4.

With reference to FIG. 5, it can be seen that the base frame 84 has at its rear portion a cross bar 152 which interconnects the two side channels 86. An adjustable screw positioning device 154 is mounted to the cross bar 152. This device 154 comprises an internally threaded member 156 mounted to the cross bar 152, and a screw member 158 mounted to the threaded member 156. The forward end of the screw member 158 attaches to the mounting frame 90 at 160. The screw member 158 can conveniently be rotated by a manually operated crank 162 extending upwardly and rearwardly from the rear end of the screw member 152. By operating the crank 162 to turn the screw member 158, the longitudinal position of the intermediate frame 90 relative to the base frame 84 can be adjusted either forwardly or rearwardly so as to adjust the neutral position of the pedals 92 and 94 either forwardly or rearwardly.

Figure 6:
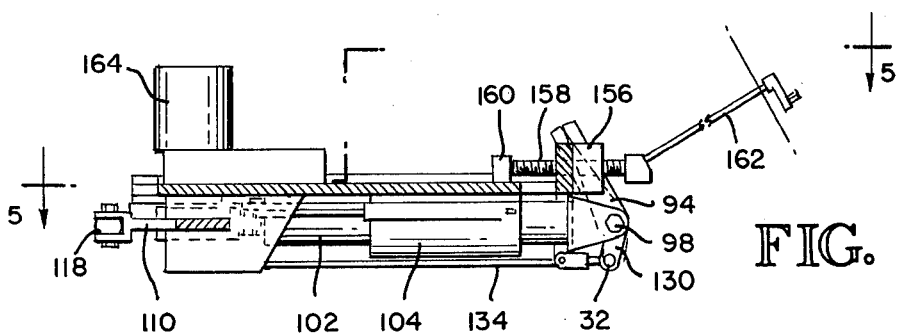
FIG. 6 is a sectional view taken along line 6—6 of FIG. 5.

In FIG. 6, there is shown a servomotor 164 mounted above the bell crank 110 of the left module 82. This servomotor 164 is arranged to rotate the bell crank 110 in response to the autopilot of the aircraft to in turn maneuver the rods 102 and pedals 92 and 94 to generate an appropriate control signal in the transducers 124.

Figure 7:
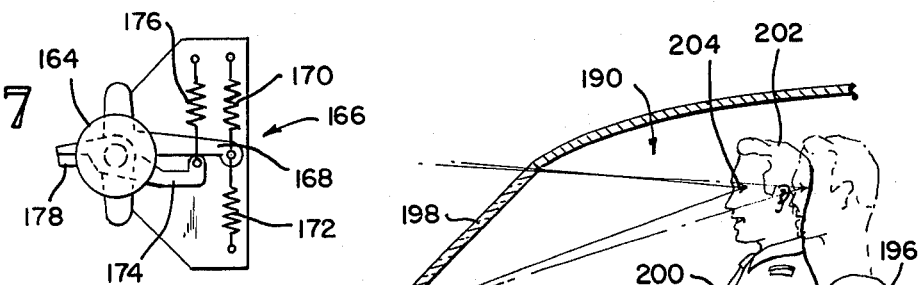
FIG. 7 is a semi-schematic view of a servo-unit and centering mechanism for the pedal assembly of FIGS. 4 through 6.

In FIG. 7, there is shown a centering mechanism 166 for the bell crank 110 of the left module 82. This centering mechanism 166 is or may be of conventional design. As shown herein, it comprises a pivotally mounted rearwardly extending finger 168 connected to two oppositely and laterally extending right and left tension springs 170 and 172. There is a second finger 174 connected to a third right tension spring 176. This finger 174 in its center position engages a stop member 178 which prevents the finger 174 from rotating to the right beyond the center position, but permits it to rotate toward the left. The combined strength of the two right springs 170 and 176 is greater than the strength of the single left spring 172. However, the strength of the left spring 172 is greater than that of the right spring 170 by itself. The finger 168 is fixedly connected to the bell crank 110. As the bell crank 110 rotates counterclockwise (as seen in FIG. 7), it moves the finger 168 away from the neutral position, and the left spring 172 urges the finger 168 (and consequently the bell crank 110) back toward the neutral position. When the bell crank 110 is rotated in the opposite direction, the finger 168 engages the finger 174 so that both fingers 168 and 174 rotate clockwise so that both of the right springs 170 and 176 act to pull the bell crank 110 back to the center position. Thus, when the two pedals 92 and 94 are moved just slightly from the neutral position, there is spring action to bring them back to the exact neutral position. Further, when there is greater movement of the pedals 92 and 94, the force exerted by the centering mechanism 166 increases so as to provide a greater resisting force corresponding to increased linear displacement of the pedals 92 and 94.

Figure 9:
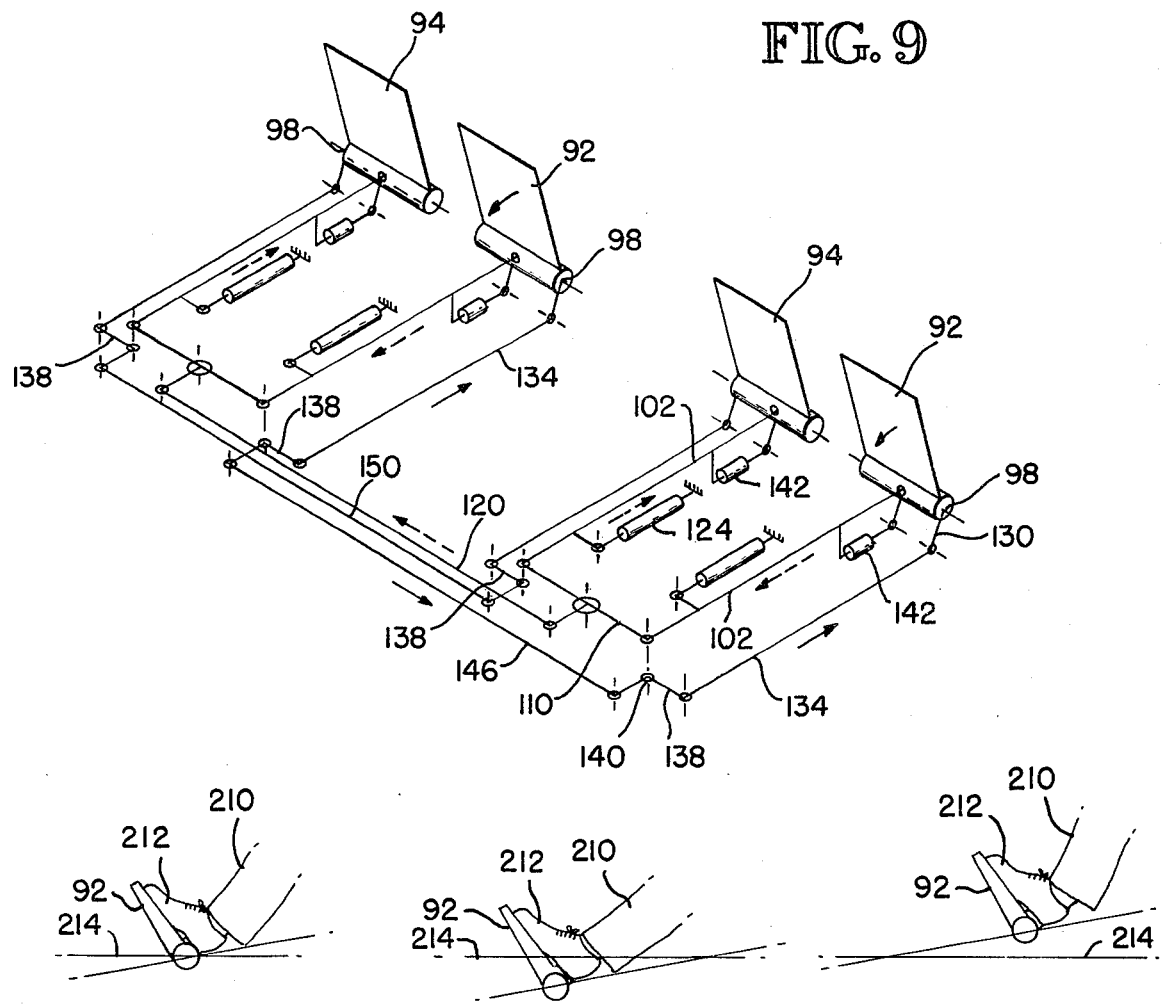
FIG. 9 is a schematic view, shown in isometric, of the operating components of the pedal assembly of FIG. 4.

In addition, each module 82 can be provided with a vertical position adjustment device, to raise or lower the rear portions of the modules 82. However, this would require some modifications in the interconnections between the modules 82. FIG. 9 indicates schematically the operation of the present invention. It can be seen that linear movement of one or the other pedals 92 and 94 causes opposite movement of the other pedal because of the interconnection of the bell crank 110. In addition, with the two bell cranks 110 interconnected by the rod 120, the movements between each pedal set is identical, regardless of which pedal set is being operated.

Also, it can be seen that each bell crank 138 is mounted at 140 to the pivot connection of the rod 102. Thus, when there is linear movement of one of the pedals 92 or 94, with no relative rotation of the pedals 92 or 94 about the axis 98, there is no rotation of the bell crank 138. Thus, the sensors 142 are isolated from the effect of any forward or aft movement of the two pedals 92 and 94. Further, the interconnecting rods 146 and 150 of the bell cranks 138 are arranged so that these also move with the linear movement of the rods 102. Thus, the brake control system responsive to the rotation of the pedals 92 and 94 about the heel axis 98 remains independent of the steering or rudder control action caused by linear movement along the lengths of the rods 102.

Figure 8:
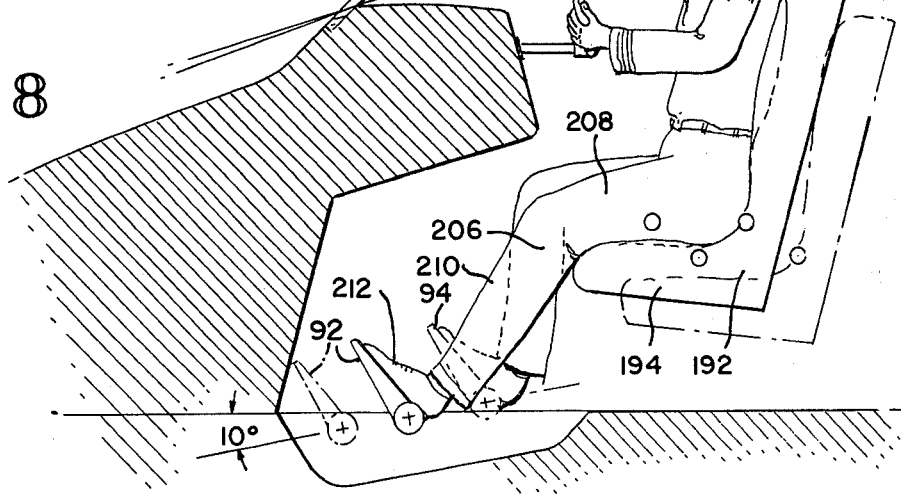
FIG. 8 is side elevational view of the cockpit assembly of the present invention, in which the pedal assembly of the present invention is incorporated.

Reference is now made to FIG. 8 to illustrate the manner in which the pedal assembly 80 of the present invention is incorporated in the pilot station of the present invention. The pilot station is generally designated 190, and it can be seen to comprise a pilot seat 192 having a generally horizontal support platform 194 to support the pilot's torso and a back rest 196. There is a forward window 198, and the pilot 200 is shown positioned with his head 202 at the optimum eye reference location 204. The pedal assembly 80 is positioned generally at floor level at a location downwardly and forwardly of the seat platform 194. For convenience of illustration, only the two pedals 92 and 94 are shown in FIG. 8. A shorter pilot is shown in full lines at 200, while a taller pilot is shown in broken lines in FIG. 8 superimposed over the full line illustration of the shorter pilot. The position indicated in broken lines for the taller pilot is actually more typical of the prior art cockpit arrangement where optimized adjustment of the pedal system is more limited. It can be seen that by moving the seat 192 rearwardly to accommodate longer legs of the pilot, the pilot's head is moved rearwardly of the optimum eye reference location. As will be described below, with the present invention, little or no forward and rear adjustment of the seat 192 is necessary. Rather, the seat can be adjusted mainly vertically for the taller pilot, thus keeping the pilot's head at the proper eye reference location 204.

The base frame 84 of each of the two modules 82 is positioned at a convenient slant, which as shown herein is an upward and rearward slant of about 10° from the longitudinal axis of the airplane. The neutral position of the two pedals 92 and 94 and the angle of the linear path of travel of the pedals 92 and 94 are selected so that the leg motion of the pilot 200 is optimized for ease of operation. As shown in full lines of FIG. 8, the most comfortable extension of the pilot's leg 206 is a combination of a moderate downward rotation of the pilot's thigh 208 along with an outward rotation of the pilot's calf 210.

To accommodate the taller pilot, the seat 192 is simply lowered moderately, but not moved to any great extent rearwardly (or not moved rearwardly at all). This enables the pilot's head 202 to remain at the optimum eye reference location 204. Since the taller pilot will normally have longer legs, the longitudinal position of the adjustable frame 90 is moved forwardly by manipulating the adjusting crank 162 of the screw positioning device 154. This in turn moves the neutral position of the pedals 92 and 94 further forward. To illustrate this, the position of the left pedal 92 is illustrated in broken lines at a more forward position. Thus, the taller pilot can still be seated comfortably relative to the seat 192 and location of the pedals 92 and 94, and yet have the benefit of having his head 202 at the proper eye reference location 204.

To position a quite short pilot in the seat 192, the seat 192 is raised, and the position of the frame 90 moved rearwardly so that the pedals 92 and 94 are moved both rearwardly and upwardly.

Figures 10A, 10B, 10C:
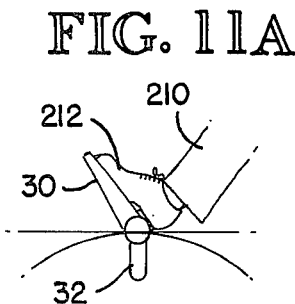
FIGS. 10A, B, and C are schematic drawings showing three pedal positions for the pedal assembly of the present invention.

Reference is now made to FIGS. 10A, 10B and 10C to illustrate the operating convenience provided by the present invention. In FIG. 10A, the left pedal 92 is shown at an intermediate location for an average sized pilot. The pilot's calf 210 is at an appropriate operating location, and his foot 212 is positioned at a comfortable angle relative to the calf 210. The level of the heel portion of the pedal 92 at this intermediate location is indicated by the broken line 214, which is carried across to FIGS. 10B and 10C to indicate relative positions.

FIG. 10B shows the calf 210 and foot 212 of a taller pilot, with the frame 90 moved further forward so that the left pedal 92 in the neutral position is at a more downward and forward location. At the same time, it can be expected that the pilot seat 192 would be lowered moderately. Thus, the calf 210 of the taller pilot and the angle of his foot 212 is still at a convenient operating position.

Finally, in FIG. 10C, the pedal 92 is shown at a further upward and rearward position to accommodate a shorter pilot, whose calf 210 and foot 212 are shown in FIG. 10C. It can be expected that the pilot seat 192 would be raised moderately from the neutral position to keep the pilot's eyes at the proper reference location 204. In this location also, the calf 210 and foot 212 are conveniently positioned for operation.

Figures 11A, 11B, 11C:
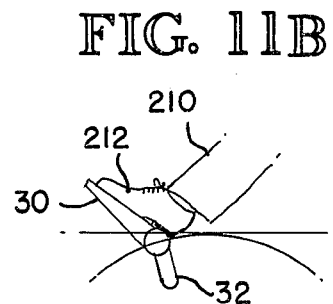
FIGS. 11A, B, C are schematic drawings similar to FIGS. 10A, B, and C, but showing the prior art pedal assembly of FIG. 3 in three different positions.

To illustrate how much pedal adjustments can be made in the prior art system such as shown in FIG. 3, reference is now made to FIGS. 11A, 11B, and 11C, which show how the pedals 30 in the prior art system could be adjusted for different sized pilots.

In FIG. 11A, the pedal 30 is shown at the intermediate position which is optimized for the average sized pilot. The extension of the pedal 30 would be on an arcuate path which has a moderate downward slant.

In FIG. 11B, the neutral position of the pedal 30 has been moved forwardly, so that the neutral position of its related mounting arm 32 is at a greater slant in an upward and forward direction. It can be seen that the extension of the pedal 30 is along an arc having a steeper angular path from the horizontal. Also, it can be expected that the taller pilot would have the seat lowered to some extent, so that the hip position of the pilot would be lower. Thus, it can be seen that the movement of the pilot's leg to depress the pedal would be in a more downward direction, which is a departure from the optimum path.

In FIG. 11C, the pedal 30 has been moved to a further rearward position to accommodate a shorter pilot. It can be seen that this has also caused a rotation of the slant of the pedal itself at the neutral position, so that the pilot's foot 212 is angled more sharply upwardly. Further, it can be expected that the pilot would have raised the seat moderately to obtain proper eye location and possibly moved the seat further forward, so that the pilot's calf 210 would be aligned more vertically. This places the pilot's foot 212 in a more uncomfortable position. Further, the forward movement of the pedal 30 would be in a more upwardly directed path. This would in turn mean that the extension of the pedal 30 would be achieved mainly by a rotation of the calf 210 about the knee joint, with relatively less downward rotation of the thigh 208. This also is a departure from the optimized leg operating motion.

Also, as shown herein, each module 82 is made so that it can be positioned above the floor level at the cockpit area. Thus, all of the components are readily accessible for replacement or maintenance. Further, since the pedal assembly 80 is made in the form of two modules 82, a single module 82 can be quite conveniently removed from the aircraft and replaced. Also, as indicated previously, since the entire pedal assembly 80 can be positioned at floor level, with no extensions below the floor, the entire pilot station can be located at a more forward location to improve the pilot's vision through the window 198.

It is to be understood that various modifications could be made to the apparatus of the present invention without departing from the inventive features thereof.

We claim:

1. A pilot control station particularly adapted for use in an aircraft where control signals are generated at the control station to control movement of aircraft components remote from the control station, said station having a vertical axis, a longitudinal axis generally coinciding with a flight path of the aircraft and a transverse axis, said pilot station comprising:
   (a) a pilot seat having a body support platform to support a pilot at the station and to establish:
      (1) an eye reference location, corresponding to a proper viewing location for a view through a window of said aircraft;
      (2) a pedal control area located downwardly and forwardly of said support platform for convenient placement of a pilot's feet;
      (3) a pedal control axis aligned relative to said support platform for optimized extended and retracted movement of the feet of the pilot;
   (b) a pedal assembly comprising:
      (1) a main frame located at the pedal control area and having right and left laterally spaced guide frame members establishing substantially linear right and left travel paths generally aligned with said pedal control axis;
   (2) right and left pedal mounting members mounted to said right and left guide frame members, respectively, for movement along said right and left travel paths;
      (3) right and left pedal members adapted to be engaged by right and left feet of the pilot, respectively, said right and left pedal members being pivotally mounted to said right and left mounting members about respective generally transversely aligned axes to be rotated by rotation of the pilot's feet;
      (4) first sensing means operatively arranged relative to said pedal mounting members to be responsive to linear location of said pedal members along said travel paths to generate a control signal related to said linear location; and
      (5) second sensing means operatively arranged relative to said pedal members to sense angular movement of said pedal members relative to said pedal mounting members and generate a control signal corresponding to said angular movement;
   (c) a base frame located at said pedal control area, said main frame being adjustably mounted to said base frame in a manner that said main frame can be moved to a higher and more rearward position to accommodate leg position of shorter pilots, and to a lower and more forward position to accommodate leg position of a taller pilot, with the positions of the main frame maintaining the travel paths of the pedal mounting members in substantial alignment with said pedal control axis;
whereby the control pedals can conveniently be moved linearly along said pedal control axis and rotated relative to said pedal mounting members to generate control signals in said first and second sensing means.

2. The control station as recited in claim 1, wherein said seat can be adjusted at least along said vertical axis to optimize pilot eye location relative to said eye reference location, with said main frame being adjustable to accommodate pilot position relative to higher or lower seat locations.

3. A pilot control station particularly adapted for use in an aircraft where control signals are generated at the control station to control movement of aircraft components remote from the control station, said station having a vertical axis, a longitudinal axis generally coinciding with a flight path of the aircraft and a transverse axis, said pilot station comprising:
 (a) a pilot seat having a body support platform to support a pilot at the station and to establish:
  (1) an eye reference location, corresponding to a proper viewing location for a view through a window of said aircraft;
  (2) a pedal control area located downwardly and forwardly of said support platform for convenient placement of a pilot's feet;
  (3) a pedal control axis extending forwardly and downwardly from said seat and aligned relative to said seat platform for optimized extended and retracted movement of the feet of the pilot along said axis;
 (b) said pilot seat being vertically adjustable so as to raise or lower said support platform relative to said eye reference location and said pedal control axis;
 (c) a pedal assembly comprising:
  (1) a base frame located at said pedal control area;
  (2) a main frame adjustably mounted to said base frame in a manner that said main frame can be moved to a higher and more rearward position relative to said pedal control axis and to a lower and more forward position relative to said pedal control axis, said main frame having right and left laterally spaced guide members establishing substantially linear right and left travel paths generally aligned with said pedal control axis;
  (3) right and left laterally spaced elongate pedal mounting members mounted to said right and left guide frame members, respectively, for movement along said right and left travel paths;
  (4) right and left pedal members adapted to be engaged by right and left feet of the pilot, respectively, said right and left pedal members being pivotally mounted to said right and left mounting members about respective generally transversely aligned axes to be rotated by rotation of the pilot's feet;
  (5) first sensing means operatively arranged relative to at least one of said pedal mounting members and its related frame member to be responsive to linear location of said one pedal mounting member along said travel paths to generate a control signal related to said linear location; and
  (6) second sensing means operatively arranged relative to both of said pedal members and to the pedal mounting members to sense angular movement of said pedal members relative to said pedal mounting members independently of linear movement of said pedal mounting members and generate a control signal corresponding to said angular movement;

whereby to accommodate a taller pilot, said seat can be moved to a lower location and said main frame can be moved to said lower and more forward position, and for a shorter pilot, the pilot seat can be moved to a higher position and the main frame to said higher and more rearward position, so that pilot location at the eye reference location is maintained and the travel paths of the pedal mounting members can be maintained in substantial alignment with the pedal control axis.

4. The station as recited in claim 3, wherein said pedal mounting members each have first and second ends, with the pedal members being mounted to said first ends, pedal movement interconnecting means being connected between said second ends in a manner that linear movement of one of said pedal mounting members causes opposite linear movement of the other of said pedal mounting members.

5. The station as recited in claim 4, wherein said interconnecting means comprises bell crank means pivotally mounted about a pivot location intermediate the second ends of the pedal mounting members, and having two opposite pivot connections to the second ends of the two pedal mounting members.

6. The station as recited in claim 5, wherein there is servomotor means adapted to be responsive to an autopilot and operatively connected to said bell crank means in a manner that rotation of said bell crank means causes relative movement of said pedal mounting members.

7. The station as recited in claim 6, wherein there is centering spring means operatively connected to said bell crank means, said centering spring means having oppositely directed spring members urging said bell crank means to an intermediate neutral position, and providing increasing resistance with greater rotation of said bell crank means from said intermediate neutral position.

8. A pilot control station particularly adapted for use in an aircraft where control signals are generated at the control station to control movement of aircraft components remote from the control station, said station having a vertical axis, a longitudinal axis generally coinciding with a flight path of the aircraft and a transverse axis, said pilot station comprising:
 (a) right and left pilot seats, each having a body support platform to support a pilot at the station and to establish:
  (1) an eye reference location, corresponding to a proper viewing location for a view through a window of said aircraft;
  (2) a pedal control area located downwardly and forwardly of said support platform for convenient placement of a pilot's feet;
  (3) a pedal control axis extending forwardly and downwardly from said seat and aligned relative to said seat platform for optimized extended and retracted movement of the feet of the pilot along said axis;
 (b) each pilot seat being vertically adjustable so as to raise or lower said support platform relative to said eye reference location and said pedal control axis;
 (c) a pedal assembly comprising right and left pedal modules, each module comprising:
  (1) a base frame located at said pedal control area;
  (2) a main frame adjustably mounted to said base frame in a manner that said main frame can be moved to a higher and more rearward position relative to said pedal control axis and to a lower and more forward position relative to said pedal control axis, said main frame having right and left laterally spaced guide members establishing substantially linear right and left travel paths generally aligned with said pedal control axis;
  (3) right and left laterally spaced elongate pedal mounting members mounted to said right and left guide frame members, respectively, for movement along said right and left travel paths;

(4) right and left pedal members adapted to be engaged by right and left feet of the pilot, respectively, said right and left pedal members being pivotally mounted to said right and left mounting members about respective generally transversely aligned axes to be rotated by rotation of the pilot's feet;

(d) sensing apparatus comprising:
  (1) first sensing means operatively arranged relative to at least one of said pedal mounting members and its related frame member to be responsive to linear location of said one pedal mounting member along said travel paths to generate a control signal related to said linear location; and
  (2) second sensing means operatively arranged relative to both of said pedal members of at least one module and to the pedal mounting members to sense angular movement of said pedal members relative to said pedal mounting members independently of linear movement of said pedal mounting members and generate a control signal corresponding to said angular movement;

(e) module interconnecting means operatively connected between said pedal modules so that movement of pedal members of one module causes a corresponding movement of the corresponding pedal member of the other module;

whereby to accommodate a taller pilot, each seat can be moved to a lower location and said main frame can be moved to said lower and more forward position, and for a shorter pilot, each pilot seat can be moved to a higher position and the main frame to said higher and more rearward position, so that pilot location at the eye reference location for each seat is maintained and the travel paths of the pedal mounting members can be maintained in substantial alignment with the pedal control axis.

9. The station as recited in claim 8, wherein said pedal mounting members of each module each have first and second ends, with the pedal members being mounted to said first ends, pedal movement interconnecting means being connected between said second ends in a manner that linear movement of one of said pedal mounting members of one module causes opposite linear movement of the other of said pedal mounting members of the same module.

10. The station as recited in claim 9, wherein said pedal movement interconnecting means comprises bell crank means pivotally mounted about a pivot location intermediate the second ends of the pedal mounting members of that module, and having two opposite pivot connections to the second ends of the two pedal mounting members.

11. The station as recited in claim 10, wherein there is servomotor means adapted to be responsive to an autopilot and operatively connected to said bell crank means of at least one of said modules in a manner that rotation of said bell crank means causes relative movement of said pedal mounting members.

12. The station as recited in claim 11, wherein there is centering spring means operatively connected to said bell crank means of at least one of said modules, said centering spring means having oppositely directed spring members urging said bell crank means to an intermediate neutral position, and providing increasing resistance with greater rotation of said bell crank means from said intermediate neutral position.

13. The station as recited in claim 10, wherein said module interconnecting means comprises a connecting member extending between said bell crank means at corresponding locations thereon spaced from the pivot locations of the two bell crank means, in a manner that movement of one of said bell crank means causes a corresponding movement of other of said bell crank means.

14. The station as recited in claim 13, wherein each of said pedal mounting members has pedal rotation bell crank means mounted thereon in a manner to be responsive to movement of the related pedal mounted to that pedal mounting member, the pedal movement bell crank means of a left pedal of one module being interconnected to a corresponding pedal movement bell crank means of the other module, in a manner that rotational movement of one of said pedal movement bell crank means causes a corresponding movement of the corresponding movement bell crank means of the other module.

15. A pedal assembly for a pilot control station where there is an optimized pedal control axis for linear pedal control movement, said pedal assembly comprising:
  (a) a base frame located at said pedal control area;
  (b) a main frame adjustably mounted to said base frame in a manner that said main frame can be moved to a higher and more rearward position relative to said pedal control axis and to a lower and more forward position relative to said pedal control axis, said main frame having right and left laterally spaced guide members establishing substantially linear right and left travel paths generally aligned with said pedal control axis;
  (c) right and left laterally spaced elongate pedal mounting members mounted to said right and left guide frame members, respectively, for movement along said right and left travel paths;
  (d) right and left pedal members adapted to be engaged by right and left feet of the pilot, respectively, said right and left pedal members being pivotally mounted to said right and left mounting members about respective generally transversely aligned axes to be rotated by rotation of the pilot's feet;
  (e) first sensing means operatively arranged relative to at least one of said pedal mounting members and its related frame member to be responsive to linear location of said one pedal mounting member along said travel paths to generate a control signal related to said linear location; and
  (f) second sensing means operatively arranged relative to both of said pedal members and to the pedal mounting members to sense angular movement of said pedal members relative to said pedal mounting members independently of linear movement of said pedal mounting members and generate a control signal corresponding to said angular movement.

16. The assembly as recited in claim 15, wherein said pedal mounting members each have first and second ends, with the pedal members being mounted to said first ends, pedal movement interconnecting means being connected between said second ends in a manner that linear movement of one of said pedal mounting members causes opposite linear movement of the other of said pedal mounting members.

17. The assembly as recited in claim 16, wherein said interconnecting means comprises bell crank means pivotally mounted about a pivot location intermediate the second ends of the pedal mounting members, and having two opposite pivot connections to the second ends of the two pedal mounting members.

18. The assembly as recited in claim 17, wherein there is servomotor means adapted to be responsive to an autopilot and operatively connected to said bell crank means in a manner that rotation of said bell crank means causes relative movement of said pedal mounting members.

19. The assembly as recited in claim 18, wherein there is centering spring means operatively connected to said bell crank means, said centering spring means having oppositely directed spring members urging said bell crank means to an intermediate neutral position, and providing increasing resistance with greater rotation of said bell crank means from said intermediate neutral position.

20. A pedal control assembly particularly adapted for use in an aircraft where control signals are generated at the control station to control movement of aircraft components remote from the control station, said pedal assembly comprising:
 (a) right and left pedal modules, each module comprising:
  (1) a base frame located at said pedal control area;
  (2) a main frame adjustably mounted to said base frame in a manner that said main frame can be moved to a higher and more rearward position relative to said pedal control axis and to a lower and more forward position relative to said pedal control axis, said main frame having right and left laterally spaced guide members establishing substantially linear right and left travel paths generally aligned with said pedal control axis;
  (3) right and left laterally spaced elongate pedal mounting members mounted to said right and left guide frame members, respectively, for movement along said right and left travel paths;
  (4) right and left pedal members adapted to be engaged by right and left feet of a pilot, respectively, said right and left pedal members being pivotally mounted to said right and left mounting members about respective generally transversely aligned axes to be rotated by rotation of the pilot's feet;
 (b) sensing apparatus comprising:
  (1) first sensing means operatively arranged relative to at least one of said pedal mounting members and its related frame member to be responsive to linear location of said one pedal mounting member along said travel paths to generate a control signal related to said linear location; and
  (2) second sensing means operatively arranged relative to both of said pedal members of at least one module and to the pedal mounting members to sense angular movement of said pedal members relative to said pedal mounting members independently of linear movement of said pedal mounting members and generate a control signal corresponding to said angular movement;
 (c) module interconnecting means operatively connected between said pedal modules so that movement of pedal members of one module causes a corresponding movement of the corresponding pedal member of the other module.

21. The assembly as recited in claim 20, wherein said pedal mounting members of each module each have first and second ends, with the pedal members being mounted to said first ends, pedal movement interconnecting means being connected between said second ends in a manner that linear movement of one of said pedal mounting members of one module causes opposite linear movement of the other of said pedal mounting members of the same module.

22. The assembly as recited in claim 21, wherein said pedal movement interconnecting means comprises bell crank means pivotally mounted about a pivot location intermediate the second ends of the pedal mounting members of that module, and having two opposite pivot connections to the second ends of the two pedal mounting members.

23. The assembly as recited in claim 22, wherein there is servomotor means adapted to be responsive to an autopilot and operatively connected to said bell crank means of at least one of said modules in a manner that rotation of said bell crank means causes relative movement of said pedal mounting members.

24. The assembly as recited in claim 23, wherein there is centering spring means operatively connected to said bell crank means of at least one of said modules, said centering spring means having oppositely directed spring members urging said bell crank means to an intermediate neutral position, and providing increasing resistance with greater rotation of said bell crank means from said intermediate neutral position.

25. The assembly as recited in claim 22, wherein said module interconnecting means comprises a connecting member extending between said bell crank means at corresponding locations thereon spaced from the pivot locations of the two bell crank means, in a manner that movement of one of said bell crank means causes a corresponding movement of other of said bell crank means.

26. The assembly as recited in claim 25, wherein each of said pedal mounting members has pedal rotation bell crank means mounted thereon in a manner to be responsive to movement of the related pedal mounted to that pedal mounting member, the pedal movement bell crank means of a left pedal of one module being interconnected to a corresponding pedal movement bell crank means of the other module, in a manner that rotational movement of one of said pedal movement bell crank means causes a corresponding movement of the corresponding movement bell crank means of the other module.

* * * * *